(12) United States Patent
Brown et al.

(10) Patent No.: US 9,074,801 B2
(45) Date of Patent: Jul. 7, 2015

(54) APPARATUS AND METHOD FOR IDENTIFYING AND OPERATING AIR PURGE IN SAFE MODE AND HAVING A DIP TUBE

(71) Applicant: Service Solutions U.S. LLC, Charlotte, NC (US)

(72) Inventors: William Brown, Owatonna, MN (US); Mark McMasters, Owatonna, MN (US)

(73) Assignee: Bosch Automotive Services Solutions INC., Warren, MI (US)

( * ) Notice: Subject to any disclaimer, the term of this patent is extended or adjusted under 35 U.S.C. 154(b) by 414 days.

(21) Appl. No.: 13/674,444

(22) Filed: Nov. 12, 2012

(65) Prior Publication Data

US 2013/0118198 A1    May 16, 2013

Related U.S. Application Data

(60) Provisional application No. 61/559,274, filed on Nov. 14, 2011.

(51) Int. Cl.
*F25B 45/00*    (2006.01)
*B60H 1/00*    (2006.01)

(52) U.S. Cl.
CPC ............ *F25B 45/00* (2013.01); *B60H 1/00585* (2013.01)

(58) Field of Classification Search
CPC ................. F25B 45/00; F25B 2345/00; F25B 2345/002; F25B 2345/003; B60H 1/00585
USPC ..................................... 62/149, 174
See application file for complete search history.

(56) References Cited

U.S. PATENT DOCUMENTS

| 5,090,211 | A | * | 2/1992 | Peters | 62/149 |
| 5,214,927 | A | * | 6/1993 | Squires | 62/77 |
| 5,359,859 | A | * | 11/1994 | Bench et al. | 62/85 |
| 2013/0118189 | A1 | * | 5/2013 | Schoenoff et al. | 62/85 |

* cited by examiner

*Primary Examiner* — Marc Norman
(74) *Attorney, Agent, or Firm* — Baker & Hostetler LLP

(57) ABSTRACT

A refrigerant recovery unit is provided and includes a safe purging mode. The safe purging mode allows non-condensable gases to be incrementally purged from a storage tank when the determined ideal vapor pressure is high, such as 40 p.s.i., in order to minimize refrigerant loss during purging. The purging can be done in small increments of time, pressure or mass. The storage tank can include a dip tube that extends into the liquid portion of the refrigerant in order to heat up the refrigerant in the tank with the heated recovered refrigerant.

20 Claims, 5 Drawing Sheets

APPARATUS AND METHOD FOR IDENTIFYING AND OPERATING AIR PURGE IN SAFE MODE AND HAVING A DIP TUBE

CROSS-REFERENCE TO RELATED APPLICATIONS

This application claims priority to provisional U.S. patent application entitled "Apparatus and Method for Identifying and Operating Air Purge in Safe Mode and Having a Dip Tube," filed Nov. 14, 2011, having Ser. No. 61/559,274, the disclosure of which is hereby incorporated by reference in its entirety.

FIELD OF THE INVENTION

The disclosure generally relates to machines for servicing vehicle air conditioning systems, and more particularly to purging non-condensable gas from refrigerant recovery machines and warming liquid refrigerant.

BACKGROUND OF THE INVENTION

Portable Recover/Recycle/Recharge (RRR) machines (refrigerant recovery units) are used in connection with the service and maintenance of refrigeration systems including a vehicle's air conditioning system. The refrigerant recovery unit connects to the vehicle's refrigerant system of the vehicle to recover refrigerant from said system, separate out oil and contaminants from the refrigerant, and recharge the system with additional refrigerant.

The refrigerant recovery unit will inevitably introduce non-condensable gases into the refrigerant during its recovery operations. As part of the recycling process, the non-condensable gases are purged out of the refrigerant tank before the refrigerant is charged back into the vehicle's refrigerant system. During purging, some refrigerant is lost in the process and this is particularly true when large amounts of non-condensable gases are purged. Thus, when large amounts of non-condensable gases are present, there is a need for a refrigerant recovery unit to alert a user that a large amount of non-condensable gases needs to be purged and potentially a large amount of refrigerant will be lost and also provide different solutions to minimize said refrigerant loss.

The refrigerant recovery unit contains a refrigerant storage tank that stores the recovered refrigerant and provides the refrigerant for recharging the refrigerant systems. It has been noted that having hot refrigerant can help with charging speed and accuracy. Typically during recovery, hot recovered refrigerant that is brought into the storage tank enters at the top of the storage tank. However, because the hot recovered refrigerant enters at the top of the storage tank, it does not adequately transfer heat to the liquid refrigerant already in the tank in order to adequately heat up the refrigerant tank to a working heat level. Therefore, there is a need for a better process to increase the heat in the refrigerant tank to a desired operational level.

SUMMARY OF THE INVENTION

In accordance with one embodiment of the present invention, a refrigerant tank includes a refrigerant outlet portion configured to allow withdrawal of a first refrigerant from the refrigerant tank during a charge cycle, wherein the refrigerant outlet portion includes an outlet tube, a purge portion configured to allow purging of non-condensable from the refrigerant tank, and a refrigerant inlet portion configured to allow a heated recovered refrigerant to enter the refrigerant tank via a dip tube that has an end positioned within a portion of the refrigerant tank, wherein the end of the dip tube conducts the heated recovered refrigerant into a liquid portion of the first refrigerant in order to raise the first refrigerant's temperature to an operation temperature.

In accordance with another embodiment of the invention, a refrigerant recovery unit includes a controller that controls functions of the refrigerant recovery unit, a refrigerant recovery circuit that couples the refrigerant recovery unit with a vehicle refrigerant system, a refrigerant charging circuit to charge the vehicle refrigerant system with a first refrigerant from a storage tank, wherein the storage tank can include a refrigerant outlet portion configured to allow withdrawal of the first refrigerant from the storage tank during a charge cycle, wherein the refrigerant outlet portion includes an outlet tube, a purge portion configured to allow purging of non-condensable from the storage tank, and a refrigerant inlet portion configured to allow a heated recovered refrigerant to enter the storage tank via a dip tube that has an end positioned within a portion of the storage tank, wherein the end of the dip tube conducts the heated recovered refrigerant into a liquid portion of the first refrigerant in order to raise the first refrigerant's temperature to an operation temperature.

In accordance with yet another embodiment, a method of raising a stored refrigerant temperature in a storage tank, includes the steps of recovering a heated refrigerant from a vehicle refrigerant system with a refrigerant recovery unit, flowing the heated refrigerant to a storage tank of the refrigerant recovery unit, controlling the flow of the heated refrigerant with a controller of the refrigerant recovery unit, conducting the heated refrigerant into the storage tank via a dip tube, and heating the stored refrigerant in the storage tank with the heated refrigerant to an operating temperature.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
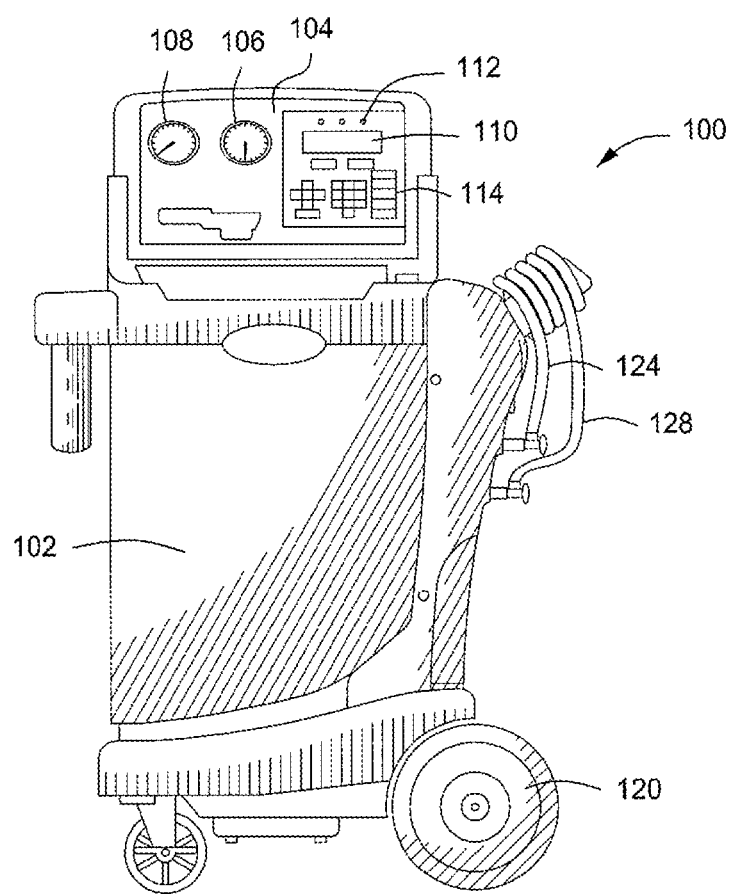
FIG. 1 is a perspective view illustrating a refrigerant recovery unit according to an embodiment of the invention.

The invention will now be described with reference to the drawing figures, in which like numerals refer to like parts throughout. A refrigerant recovery unit is provided and includes capabilities such as alerting a user when a large amount of non-condensable gases needs to be purged and provides purging options to the user. Further, the refrigerant recovery unit can also heat the refrigerant in a storage tank using heated recovered refrigerant delivered via an immersed dip tube disposed in the storage tank. The refrigerant recovery unit is capable of recover/recycle/recharge a refrigerant system such as a vehicle's refrigerant system.

Currently, the most common refrigerant used in vehicle's refrigerant systems is the IFC-134a. However, new refrigerants are being introduced in order to decrease global warming that can be caused by HFC-134a. These new refrigerants, for example, include HFO-1234yf, R-152a, and $CO_2$ and can also be used in the various embodiments described herein.

FIG. 1 is a perspective view illustrating a refrigerant recovery unit 100 according to an embodiment of the invention. The refrigerant recovery unit 100 can be the CoolTech 34788™ from Robinair™ based in Owatonna, Minn. (Service Solutions U.S. LLC). The refrigerant recovery unit 100 includes a cabinet 102 to house the major components of the system (See FIG. 2). The cabinet 102 may be made of any material such as thermoplastic, steel and the like.

The cabinet 102 includes a control panel 104 that allows the user to operate the refrigerant recovery unit 100. The control panel 104 may be part of the cabinet 102 as shown in FIG. 1 or separated according another embodiment. The control panel 104 includes high and low gauges 106, 108, respectively. The gauges may be analog or digital as desired by the user. The control panel 104 has a display 110 to provide information to the user, such as certain operating status of the refrigerant recovery unit 100 or provide messages or menus to the user. Located near the display 110 is LEDs 112 to indicate to the user the operational status of the refrigerant recovery unit 100. A user interface 114 is also included on the control panel 104. The user interface 114 allows the user to interact and operate the refrigerant recovery unit 100 and can include an alphanumeric keypad and directional arrows.

The cabinet 102 further includes connections for hoses 124, 128 that connect the refrigerant recovery unit 100 to a refrigerant containing device, such as the vehicle's refrigerant system. In order for the refrigerant recovery unit 100 to be mobile, wheels 120 are provided at a bottom portion of the refrigerant recovery unit 100.

Figure 2:
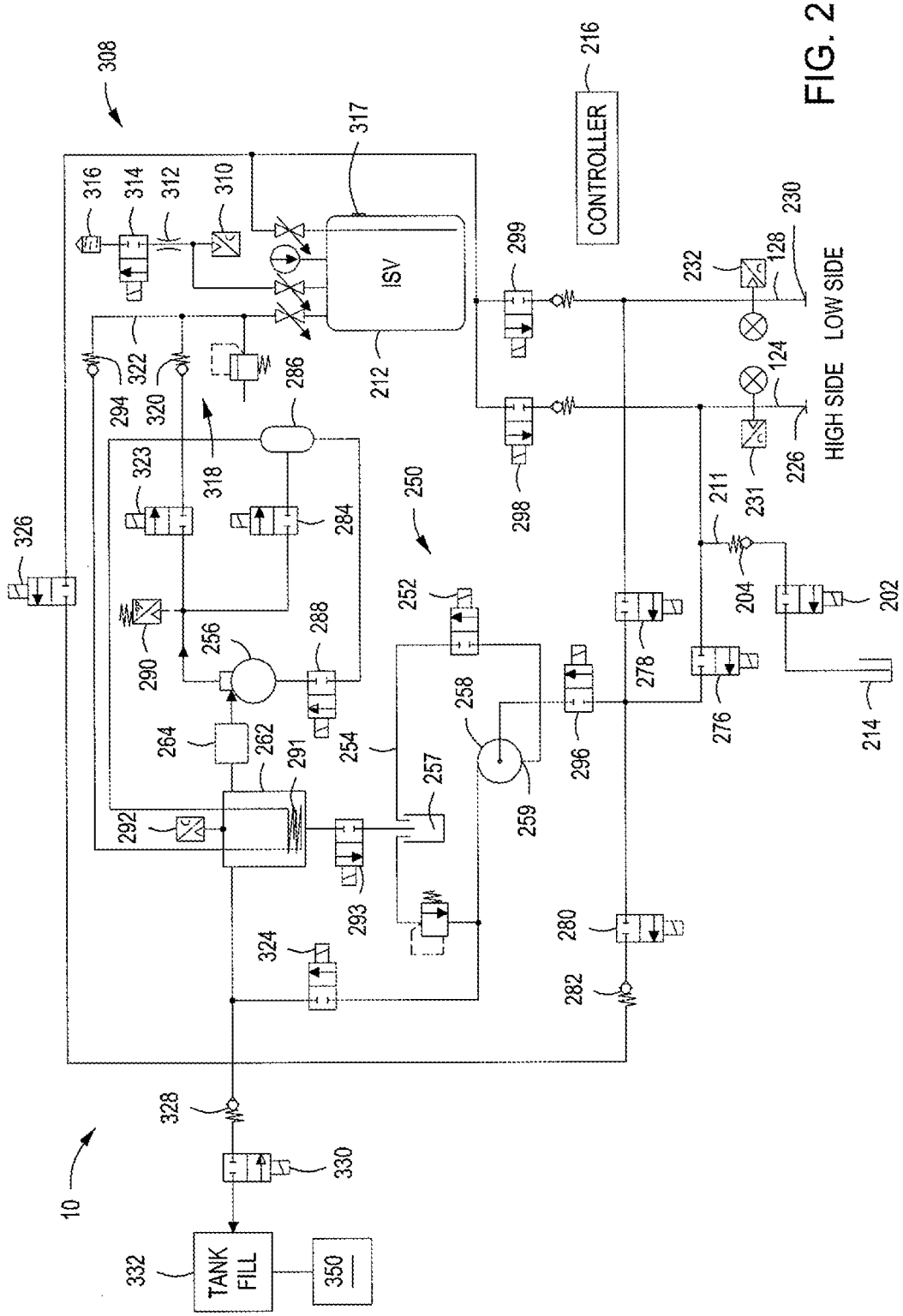
FIG. 2 illustrates the major components of the refrigerant recovery unit of FIG. 1 according to an embodiment of the invention.

FIG. 2 illustrates the major components of the refrigerant recovery unit of FIG. 1 according to an embodiment of the invention. In one embodiment, to recover refrigerant, hoses 124 and 128 are coupled to the refrigeration system of the vehicle, at connections 226 (high side) and 230 (low side), respectively. The recovery cycle is initiated by the opening of high pressure and low pressure solenoids 276, 278, respectively. This allows the refrigerant within the vehicle's refrigeration system to flow through a recovery valve 280 and a check valve 282. The refrigerant flows from the check valve 282 into a system oil separator 262, where it travels through a filter/dryer 264, to an input of a compressor 256. Refrigerant is drawn through the compressor 256 through a normal discharge valve 284 and through a compressor oil separator 286, which circulates oil back to the compressor 256 through an oil return valve 288. The refrigerant recovery unit 100 includes a high pressure switch 290 in communication with a controller 216, which is programmed to determine an upper pressure limit, for example, 435 psi, to optionally shut down the compressor 256 to protect the compressor 256 from excessive pressure. The controller 216 can also be, for example, a microprocessor, a field programmable gate array (FPGA) or application specific integrated circuit (ASIC). The controller 216 via a wired or wireless connection (not shown) controls the various valves and other components (e.g. vacuum, compressor) of the refrigerant recovery unit 100 described herein. In some embodiments of the invention, any or all of the electronic solenoid or electrically activated valves may be connected and controlled by the controller 216.

If a purging of the system is desired, a high-side clear solenoid (not shown) may optionally be coupled to the output of the compressor 256 to release the recovered refrigerant transferred from compressor 256 directly into a storage tank 212, instead of through a path through the normal discharge valve 284.

The heated compressed refrigerant exits the compressor oil separator 286 and then travels through a loop of conduit or heat exchanger 291 for cooling or condensing. As the heated refrigerant flows through the heat exchanger 291, it gives off heat to the cold refrigerant in the system oil separator 262, and assists in maintaining the temperature in the system oil separator 262 within a working range. Coupled to the system oil separator 262 is a switch or transducer 292, such as a low pressure switch or pressure transducer, for example, that senses pressure, and provides an output signal to the controller 216, through a suitable interface circuit, programmed to detect when the pressure of the recovered refrigerant is down to 13 inches of mercury, for example. An oil separator drain valve 293 drains the recovered oil into the container 257. Finally, the recovered refrigerant flows through a normal discharge check valve 294 and into the storage tank 212.

The evacuation cycle begins by the opening of high pressure and low pressure solenoids 276 and 278 and valve 296, leading to the input of a vacuum pump 258. Prior to opening valve 296, an air intake valve (not shown) is opened, allowing the vacuum pump 258 to start exhausting air. The vehicle's refrigerant system is then evacuated by the closing of the air intake valve and opening the valve 296, allowing the vacuum pump 258 to exhaust any trace gases remaining until the pressure is approximately 29 inches of mercury, for example. When this occurs, as detected by pressure transducers 231 and 232, optionally coupled to the high side 226 and low side 230 of the vehicle's refrigeration system and to the controller 216, the controller 216 turns off valve 296 and this begins the recharging cycle.

The recharging cycle begins by opening charge valve 298 to allow the refrigerant in storage tank 212, which is at a pressure of approximately 70 psi or above, to flow through the high side of the vehicle's refrigeration system. The flow through charge valve 298 is for a period of time that is programmed to provide a full charge of refrigerant to the vehicle. Optionally, charge valve 299 may be opened to charge the low side. The charge valve 299 may be opened alone or in conjunction with charge valve 298 to charge the vehicle's refrigerant system.

Other components shown in FIG. 2 include an oil inject circuit having an oil inject valve 202 and an oil inject hose or line 211. The oil inject hose 211 is one example of a fluid transportation means for transmitting oil for the refrigerant recovery unit 100. The oil inject hose 211 may be one length of hose or multiple lengths of hose or tubing or any other suitable means for transporting fluid. The oil inject hose 211 connects at one end to an oil inject bottle 214 and on the other end couples to the refrigerant circuit in the refrigerant recovery unit 100. Disposed along the length of the oil inject hose 211 are the oil inject valve 202 and an oil check valve 204. The oil inject path follows from the oil inject bottle 214, through the oil inject valve 202, to the junction with the high side charge line, and then to the vehicle's refrigerant system.

FIG. 2 also illustrates a vacuum pump oil drain circuitry 250 that includes a vacuum pump oil drain valve 252 that is located along a vacuum pump oil drain conduit 254 connecting a vacuum pump oil drain outlet 259 to a container 257 for containing the drained vacuum pump oil. The vacuum pump oil drain valve 252 may be an electronically activated solenoid valve controlled by controller 216. The connection may be a wireless or wired connection. In other embodiments the vacuum pump oil drain valve 252 may be a manually activated valve and manually actuated by a user. The vacuum pump oil drain conduit 254 may be a flexible hose or any other suitable conduit for provided fluid communication between the vacuum pump oil drain outlet 259 and the container 257.

FIG. 2 also illustrates an air purging apparatus 308. The air purging apparatus 308 allows the refrigerant recovery unit 100 to be purged of non-condensable gases, such as air. Air purged from the refrigerant recovery unit 100 may exit the storage tank 212, through an orifice 312, through a purging valve 314 and through an air diffuser 316. In some embodiments, the orifice may be 0.028 of an inch. A pressure transducer 310 may measure the pressure contained within the storage tank 212 and air purging apparatus 308. The pressure transducer 310 may send the pressure information to the controller 216. And when the pressure is too high, as calculated by the controller, purging is required. The purging valve 314 may be selectively actuated to permit or not permit the air purging apparatus 308 to be open to the ambient conditions. A temperature sensor 317 may be coupled to the main tank to measure the refrigerant temperature therein. The placement of the temperature sensor 317 may be anywhere on the tank or alternatively, the temperature sensor may be placed within a refrigerant line 322. The measured temperature and pressure may be used to calculate the ideal vapor pressure for the type of refrigerant used in the refrigerant recovery unit 100. The ideal vapor pressure can be used to determine when the non-condensable gases need to be purged and how much purging will be done in order to get the refrigerant recovery unit 100 to function properly. A safe purging mode from high non-condensable gas pressure is further described below.

High side clearing valves 318 may be used to clear out part of the high pressure side of the system. The high side clearing valves 318 may include valve 323 and check valve 320. Valve 323 may be a solenoid valve and controlled by controller 216. When it is desired to clear part of the high side, valve 323 is opened. Operation of the compressor 256 will force refrigerant out of the high pressure side through valves 323 and 320 and into the storage tank 212. During this procedure the normal discharge valve 284 may be closed.

A deep recovery valve 324 is provided to assist in the deep recovery of refrigerant. When the refrigerant from the refrigerant system has, for the most part, recovered into the refrigerant recovery unit 100, the remaining refrigerant may be extracted from the refrigerant system by opening the deep recovery valve 324 and turning on the vacuum pump 258.

When charging a vehicle's refrigerant system, the power charge valve 326 may be opened. The refrigerant recovery unit 100 may also add refrigerant to refrigerant system that may be low on refrigerant. In order to obtain refrigerant from a refrigerant source, the refrigerant recovery unit 100 may include tank fill structure 332, and valves 328 and 330. The tank fill structure 332 may be configured to attach to a refrigerant source 350. The tank fill valve 330 may be a solenoid valve and the check valve 328 may be a check valve. In other embodiments, tank fill valve 330 may be a manually operated valve. When it is desired to allow refrigerant from the refrigerant source 350 to enter the refrigerant recovery unit 100, the tank fill structure 332 is attached to the refrigerant source 350 and the tank fill valve 330 is opened. The check valve 328 prevents refrigerant from the refrigerant recovery unit 100 from flowing out of the refrigerant recovery unit 100 through the tank fill structure 332. When the tank fill structure 332 is not connected to the refrigerant source 350, the tank fill valve 330 is kept closed. The tank fill valve 330 may be connected to and controlled by the controller 216.

When purging non-condensable gases, refrigerant is often purged along with the non-condensable gases. This is particularly true when purging from high pressure, for example, from 50 p.s.i. to 2 p.s.i. and thus, it is desirable to minimize refrigerant loss. To minimize refrigerant loss during purging from high pressure, the system should be purged in a controlled incremental manner.

Figure 3:
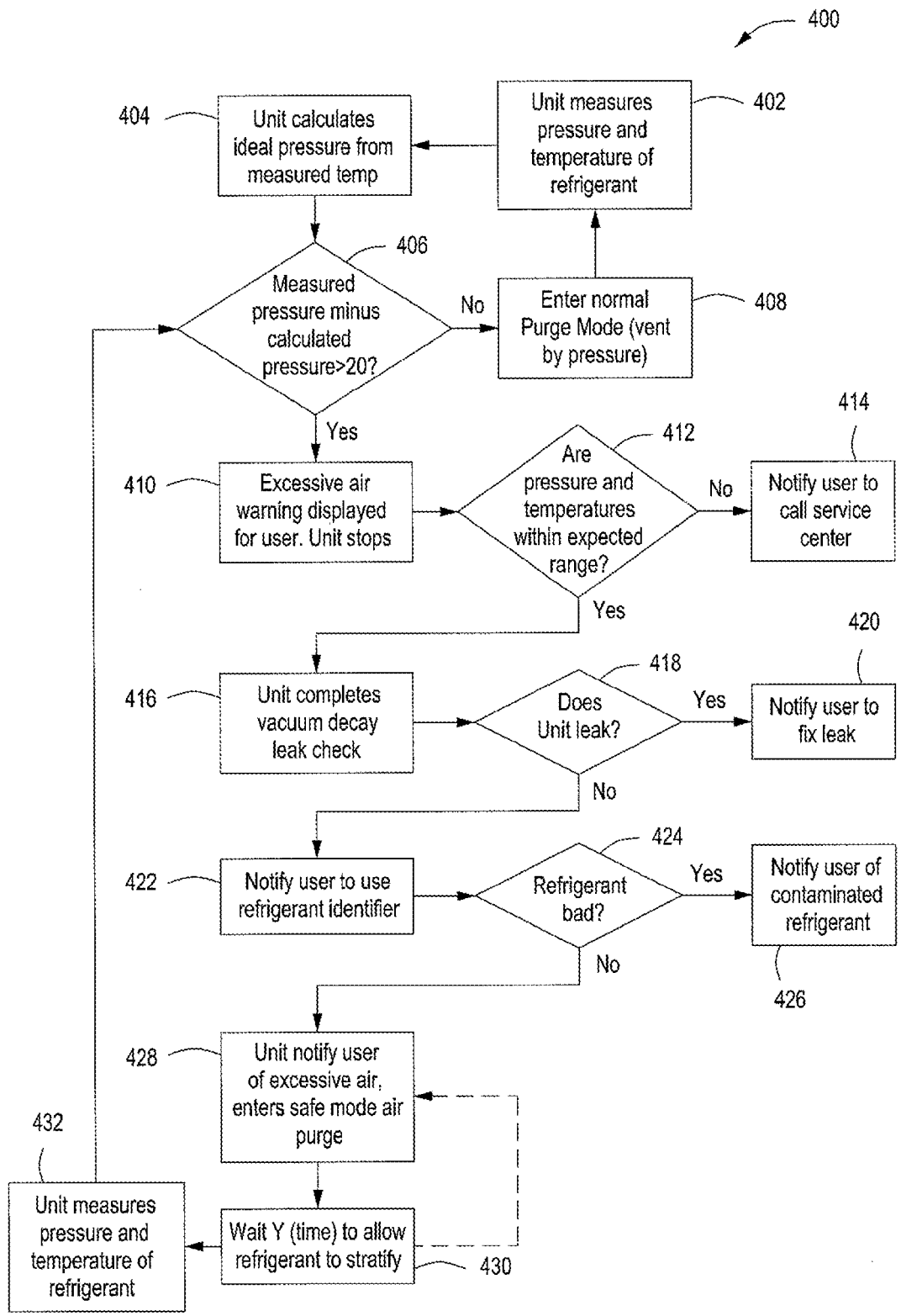
FIG. 3 is an example of a flow diagram for purging the refrigerant recovery unit shown in FIG. 1 according to an embodiment of the invention.

FIG. 3 is an example of a flow diagram 400 for purging the refrigerant recovery unit 100 shown in FIG. 1 according to an embodiment of the invention. At step 402, the refrigerant recovery unit 100 measures the pressure and temperature of the refrigerant. In one embodiment, the controller 216 measures the pressure of the refrigerant in the storage tank 212 via the pressure transducer 310 and the temperature of the refrigerant in the storage tank 212 via the temperature sensor 317. Step 402 may be done, for example, about 10 minutes, five minutes, three minutes, one minute after recovery or prior to charging. At step 404, the refrigerant recovery unit 100 calculates, via the controller 216, the ideal pressure of the refrigerant in the tank based on the measured temperature of the tank. Alternatively, the measured pressure or both the temperature and pressure may also be used. In one embodiment, the ideal vapor pressure may be calculated by accessing a database stored in a memory of the refrigerant recovery unit 100 that contains the ideal pressure information for the type of refrigerant used in the refrigerant system. At step 406, the refrigerant recovery unit 100, via the controller 216, determines if the measured pressure minus the calculated ideal vapor pressure is greater than about 20 p.s.i. In other embodiments, the amount at step 406 may range from about 20 p.s.i. to 50 p.s.i. or even greater. If no, then proceed to step 408 and enter a "normal purge mode" or vent by pressure and return to step 402. Normal purge mode may be a standard purge mode that is known in the art. If yes, then refrigerant recovery unit 100 proceeds to step 410, where an excessive air warning is displayed (display 110) to the user and the refrigerant recovery unit 100 stops its operations (charging, recovery, recycle) for a period of time. At step 412, the refrigerant recovery unit 100 determines if the pressures and temperatures are within expected ranges. The determination is to ensure that the temperature sensor and/or the pressure transducer are working properly before purging starts. In some embodiments, the temperature sensor of the tank may be checked against the ambient temperature and the pressure transducer may be checked against a hose pressure sensor. If no, then proceed to step 414 where the user is notified to call a service center. The service call allows the pressure and/or the temperature sensor to be replaced and to prevent unnecessary purging due to faulty readings.

At step 416, the refrigerant recovery unit 100 completes a vacuum decay leak check and proceeds to step 418. At step 418, a determination, via the controller 216, is made as to whether the refrigerant recovery unit 100 leaks. If yes, then proceed to step 420, where the refrigerant recovery unit notifies (via the display) the user to fix the leak. If no, then proceed to step 422 where the refrigerant recovery unit 100 notifies (via the display) the user to use a refrigerant identifier. At step 424, the refrigerant recovery unit 100 in conjunction with the identifier determines if the refrigerant is bad or contaminated (with other types of refrigerant, for example). If the refrigerant is contaminated, then at step 426, the refrigerant recovery unit notifies (via the display) the user that the refrigerant is contaminated. If the refrigerant is not contaminated then at step 428, the refrigerant recovery unit notifies (via the display) the user of excessive air and enters the "safe mode" air purge.

In the "safe mode," the purging from high pressure, such as 40 p.s.i. or higher to a lower pressure such as 2 or 3 p.s.i. will proceed in increments of time, mass, pressure, a combination thereof or the like. By purging in smaller increments, less refrigerant is lost to the atmosphere. Thus, in one embodiment increments of time may be utilized. Purging in safe mode based on time can be done in increments, for example, of between 1-20 seconds, such as 1 second, 2 seconds, 4 seconds, 6 seconds, 10 seconds, 15 seconds and 20 seconds or a combination thereof. Other increments such as less than 1 second or higher than 20 seconds are also within the embodiments of the invention. One embodiment, the purge valve may be opened for 5 seconds, then 1 second, then 3 seconds, and then 0.5 seconds. The various combination of purging in certain increments will decrease the amount of refrigerant loss during purging.

In another embodiment, purging in safe mode based on mass can be done in increments of ounces or pounds, such as, for example, between 1 to 50 ounces, such as 1 ounce, 2 ounces, 4 ounces, 6 ounces, 8 ounces, 10 ounces, 12 ounces, 14 ounces, 16 ounces, etc. or any combination thereof. In another embodiment, purging in safe mode based on pressure can be done in increments of p.s.i., such as 0.01 to 10 p.s.i. The increments may be 0.01 p.s.i., 0.05 p.s.i., 1 p.s.i., 3 p.s.i., 5 p.s.i., 10 p.s.i., any other amount or a combination thereof. The purging in increments (time, mass, or pressure, etc.) continues until the pressure drops to the desired pressure. The desired pressure may be a small amount of pressure, such as 2 p.s.i. or 5 p.s.i., above the calculated ideal vapor pressure. For example, the increment may start at one purge of 5 p.s.i. then two 1 p.s.i. purges, then one purge of 3 p.s.i., and so on. The various combination of purging in certain increments will decrease the amount of refrigerant loss during purging.

At step 430, the refrigerant recovery unit will wait till for a certain period of time to allow the refrigerant to stratify. This may be from 2-5 minutes to a few hours to a day to a couple of days depending on the environmental conditions of the surroundings. By allowing the refrigerant in the storage tank to equalize after incremental purging, the refrigerant can settle back into the liquid phase and not lost in the next purging increment. Step 430 can proceed to step 432.

At step 432, another measurement similar to step 402 is made. Then the refrigerant recovery unit returns to step 406. Alternatively, after step 430, then the refrigerant recovery unit 100 returns to step 428 and reenters the safe purge mode to continue purging because the refrigerant recovery unit determined that additional incremental purging is needed.

Figure 4A:
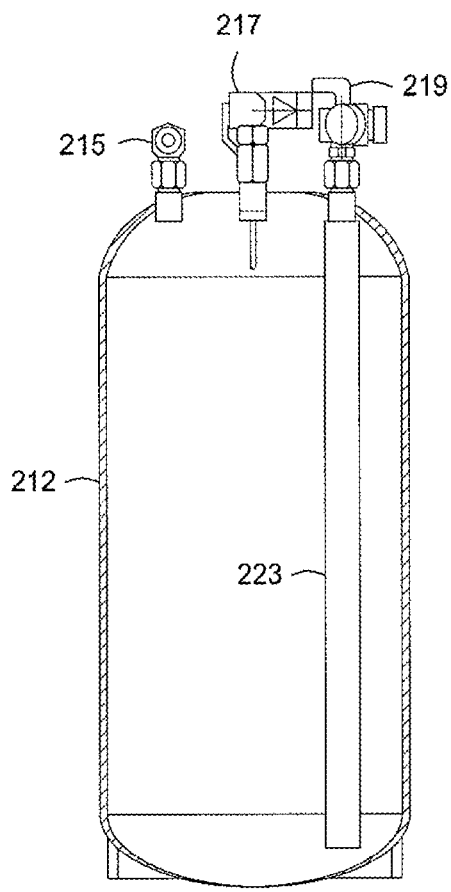
FIGS. 4A and 4B illustrate a storage tank without a dip tube and with a dip tube, respectively, according to an embodiment of the invention.
Figure 4B:
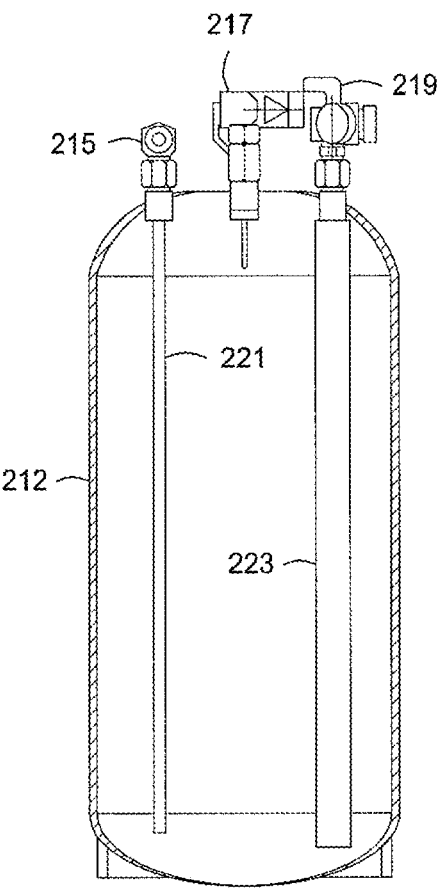

FIGS. 4A and 4B illustrate the storage tanks 212 without and with a dip tube 221, respectively. The storage tank 212 includes a refrigerant inlet portion 215, a refrigerant outlet portion 219 with an outlet tube 223 and purge portion 217. The refrigerant outlet portion 219 is where the refrigerant exits the storage tank 212 in order to charge the vehicle's refrigerant system. The purge portion 217 allows non-condensable to be purged as discussed herein. The refrigerant inlet portion 215 is where recovered refrigerant will enter the storage tank 212. The recovered refrigerant (mainly in vapor form) will be at a higher temperature than the refrigerant in the storage tank 212. The heated recovered refrigerant enters at the top of the tank as shown in FIG. 4A and warms the storage tank. However, typically, only the top portion (also mainly vapor phase) of the refrigerant is warmed and the remaining liquid refrigerant in the storage tank does not warm to the desired operating level (See FIG. 5A). The operating level temperature may range from 10 C to 40 C.

As shown in FIG. 4B, the refrigerant inlet portion 215 includes a dip tube 221 that allows the heated recovered refrigerant to be dispersed at the bottom of the storage tank 212 so that the heated recovered refrigerant has to flow through the liquid refrigerant in the storage tank. This allows for an increase in heat transfer to the liquid refrigerant (See FIG. 5B). Additionally, the dip tube 221 can be made from a heat conducting material such as copper or iron or tin, so that the heat from the recovered refrigerant can also be transferred to the liquid refrigerant as the recovered refrigerant is flowed through to the bottom of the storage tank 212. The dip tube 221 opening into the tank may be positioned at any level of the tank where the refrigerant is in liquid form including near the bottom portion of the storage tank. In other embodiments, the dip tube 221 opening may be positioned at a fifth, a quarter, a third, two-thirds and the like from the top of the tank.

Figure 5A:
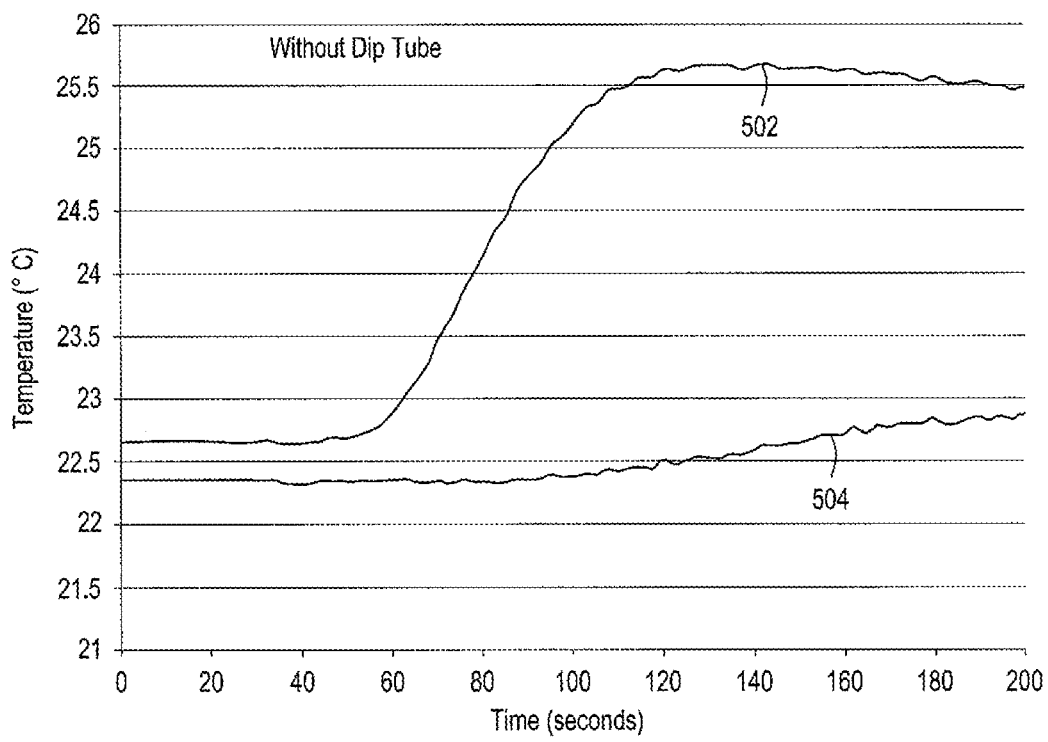
FIGS. 5A and 5B illustrate a temperature chart of a tank without a dip tube and with a dip tube, respectively, according to an embodiment of the invention.
Figure 5B:
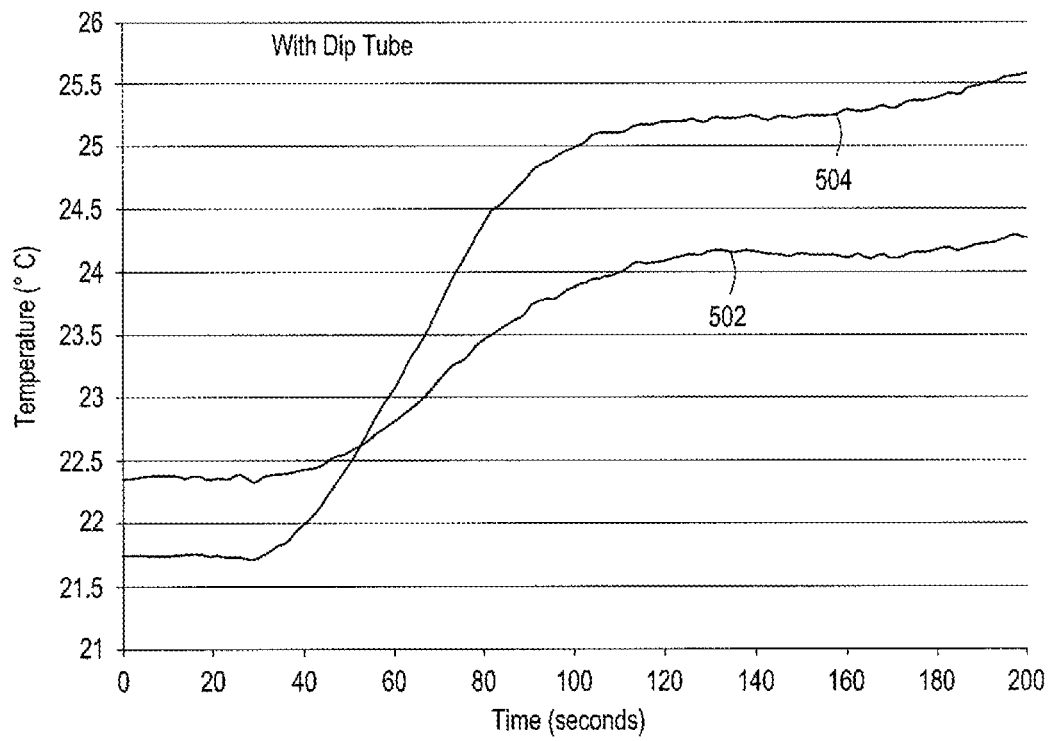

FIGS. 5A and 5B are graphs relating to temperature in the storage tank with no the dip tube and with the dip tube, respectively, according to an embodiment of the invention. FIG. 5A includes line 502 illustrating the temperature at near the top portion of the storage tank and line 504 illustrating the temperature at near the bottom of the storage tank when there is no dip tube in the storage tank 212. Because there is no dip tube, the temperature of the storage tank 212 near the bottom (where the liquid refrigerant is located) is lower than the temperature near the top of the storage tank where the heated recovered refrigerant enters the storage tank 212. FIG. 5B shows the same lines 502 and 504 but line 504 is elevated. Line 504 is elevated (compared to FIG. 5A) because with the dip tube in place, the temperature of the refrigerant near the bottom of the storage tank 212 can be heated leading to a better operational refrigerant temperature.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A refrigerant tank, comprising:
 a refrigerant outlet portion configured to allow withdrawal of a first refrigerant from the refrigerant tank during a charge cycle, wherein the refrigerant outlet portion includes an outlet tube;
 a purge portion configured to allow purging of non-condensable from the refrigerant tank; and
 a refrigerant inlet portion configured to allow a heated recovered refrigerant to enter the refrigerant tank via a dip tube that has an end positioned within a section of the refrigerant tank, wherein the end of the dip tube conducts the heated recovered refrigerant into a liquid portion of the first refrigerant in order to raise the first refrigerant's temperature to an operation temperature.

2. The refrigerant tank of claim 1, wherein the section is about a top third of the refrigerant tank.

3. The refrigerant tank of claim 1, wherein the section is about two-thirds from a top of the refrigerant tank.

4. The refrigerant tank of claim 1, wherein the section is about a middle of the refrigerant tank.

5. The refrigerant tank of claim 1, wherein the dip tube is made from a heat conducting material.

6. The refrigerant tank of claim 5, wherein the heat conducting material is copper, tin or iron.

7. The refrigerant tank of claim 1, wherein the section of the refrigerant tank contains mainly a liquid form of the first refrigerant.

8. A refrigerant recovery unit, comprising:
 a controller that controls functions of the refrigerant recovery unit;
 a refrigerant recovery circuit that couples the refrigerant recovery unit with a vehicle refrigerant system;
 a refrigerant charging circuit to charge the vehicle refrigerant system with a first refrigerant from a storage tank, wherein the storage tank comprises:
  a refrigerant outlet portion configured to allow withdrawal of the first refrigerant from the storage tank during a charge cycle, wherein the refrigerant outlet portion includes an outlet tube;
  a purge portion configured to allow purging of non-condensable from the storage tank; and
  a refrigerant inlet portion configured to allow a heated recovered refrigerant to enter the storage tank via a dip tube that has an end positioned within a section of the storage tank, wherein the end of the dip tube conducts the heated recovered refrigerant into a liquid portion of the first refrigerant in order to raise the first refrigerant's temperature to an operation temperature.

9. The refrigerant recovery unit of claim 8, wherein the section is about a top third of the storage tank.

10. The refrigerant recovery unit of claim 8, wherein the section is about two-thirds from a top of the storage tank.

11. The refrigerant recovery unit of claim 8, wherein the section is about a middle of the storage tank.

12. The refrigerant recovery unit of claim 8, wherein the dip tube is made from a heat conducting material.

13. The refrigerant recovery unit of claim 12, wherein the dip tube is configured to conduct heat along the heat tube as the heated recovered refrigerant flows into the liquid portion of the first refrigerant.

14. The refrigerant recovery unit of claim 12, wherein the heat conducting material is copper, tin or iron.

15. The refrigerant recovery unit of claim 8, wherein the section of the refrigerant tank contains mainly a liquid form of the first refrigerant.

16. A method of raising a stored refrigerant temperature in a storage tank, comprising the steps of:
 recovering a heated refrigerant from a vehicle refrigerant system with a refrigerant recovery unit;
 flowing the heated refrigerant to a storage tank of the refrigerant recovery unit;
 controlling the flow of the heated refrigerant with a controller of the refrigerant recovery unit;
 conducting the heated refrigerant into the storage tank via a dip tube; and
 heating the stored refrigerant in the storage tank with the heated refrigerant to an operating temperature.

17. The method of claim 16 further comprising the step of: purging non-condensable from the storage tank via a purge valve in the refrigerant recovery unit.

18. The method of claim 17 further comprising the step of: performing a vacuum decay leak check.

19. The method of claim 16 further comprising the step of: conducting the heated refrigerant via an end of the dip tube to a liquid portion of the stored refrigerant.

20. The method of claim 16 further comprising the step of: conducing a heat from the heated refrigerant along a length of the dip tube, wherein the dip tube is made from a heat conducting material.

* * * * *